US009262378B2

(12) United States Patent
Wang et al.

(10) Patent No.: US 9,262,378 B2
(45) Date of Patent: Feb. 16, 2016

(54) METHODS AND DEVICES FOR MULTI-GRANULARITY PARALLEL FFT BUTTERFLY COMPUTATION (75) Inventors: Donglin Wang, Beijing (CN); Tao Wang, Beijing (CN); Shaolin Xie, Beijing (CN); Jie Hao, Beijing (CN); Leizu Yin, Beijing (CN)

(73) Assignee: Institute of Automation, Chinese Academy of Sciences, Beijing (CN)

( * ) Notice: Subject to any disclaimer, the term of this patent is extended or adjusted under 35 U.S.C. 154(b) by 275 days.

(21) Appl. No.: 14/117,192

(22) PCT Filed: Dec. 31, 2011

(86) PCT No.: PCT/CN2011/085137
§ 371 (c)(1),
(2), (4) Date: Nov. 12, 2013

(87) PCT Pub. No.: WO2013/097217
PCT Pub. Date: Jul. 4, 2013

(65) Prior Publication Data
US 2014/0330880 A1 Nov. 6, 2014

(51) Int. Cl.
*G06F 17/14* (2006.01)
(52) U.S. Cl.
CPC .................................... *G06F 17/142* (2013.01)
(58) Field of Classification Search
None
See application file for complete search history.

(56) References Cited

U.S. PATENT DOCUMENTS

| | | | |
|---|---|---|---|
| 6,792,441 B2 | 9/2004 | Jaber | |
| 2004/0015530 A1* | 1/2004 | Kang | G06F 17/142 708/404 |
| 2004/0172435 A1 | 9/2004 | Goel | |
| 2005/0058059 A1* | 3/2005 | Amer | G06F 17/142 370/210 |
| 2006/0224651 A1* | 10/2006 | Madhavapeddi | G06F 17/142 708/404 |
| 2008/0256159 A1* | 10/2008 | Schwoerer | G06F 17/142 708/404 |
| 2010/0179978 A1* | 7/2010 | Halvarsson | G06F 17/142 708/404 |
| 2011/0099216 A1* | 4/2011 | Sun | G06F 17/142 708/404 |
| 2011/0153706 A1* | 6/2011 | Yancey | G06F 17/142 708/404 |
| 2014/0089369 A1* | 3/2014 | Wang | G06F 17/142 708/404 |
| 2014/0089370 A1* | 3/2014 | Xie | G06F 17/142 708/409 |
| 2014/0330880 A1* | 11/2014 | Wang | G06F 17/142 708/404 |
| 2014/0337401 A1* | 11/2014 | Xie | G06F 17/142 708/404 |

FOREIGN PATENT DOCUMENTS

| | | |
|---|---|---|
| CN | 1504890 A | 6/2004 |
| CN | 101504637 A | 8/2009 |
| CN | 101571849 A | 11/2009 |
| CN | 101582059 A | 11/2009 |
| CN | 102541813 A | 7/2012 |
| CN | 102200964 B | 5/2013 |

OTHER PUBLICATIONS

International Search Report for corresponding International Application No. PCT/CN2011/085137, mailed Oct. 18, 2012 (4 pages).
Written Opinion for corresponding International Application No. PCT/CN2011/085137, mailed Oct. 18, 2012 (4 pages).

* cited by examiner

*Primary Examiner* — David H Malzahn
(74) *Attorney, Agent, or Firm* — Osha Liang LLP (57) ABSTRACT

A method and device for multi-granularity parallel FFT butterfly computation. The method and device read data and twiddle factors for computation in one butterfly group from the input buffers and the twiddle factor buffer at a time, perform multi-stage butterfly computation in parallel using uniform butterfly representations, and write the results back to the input buffers. The method and device greatly reduce the frequency for accessing the memory, improve speed for butterfly computation, and reduce power consumption. The method and device achieve multi-granularity butterfly computation of various data formats in a parallel and efficient manner. The method and device can specify the parallel granularity and data format for butterfly computation according to particular applications, and are applicable to FFT butterfly computation of balanced and unbalanced groups.

10 Claims, 7 Drawing Sheets

METHODS AND DEVICES FOR MULTI-GRANULARITY PARALLEL FFT BUTTERFLY COMPUTATION

CROSS-REFERENCE TO RELATED APPLICATIONS

This is a national stage application based on PCT/CN2011/085137, filed on Dec. 31, 2011. This application claims the priority from the same, and hereby incorporates the same by reference in its entirety.

TECHNICAL FIELD

The present application relates to Fast Fourier Transform (FFT) butterfly computation in Integrated Circuit (IC) design, and in particular to methods and devices for multi-granularity parallel FFT butterfly computation.

BACKGROUND

Signal processing systems are typically required to convert signals between time and frequency domains. The Fast Fourier Transform (FFT) algorithm enables such signal conversion between time and frequency domains. Compared with other transform algorithms, FFT has advantages of uniform structure and less computation, and thus has been widely used in signal processing systems.

Figure 1:
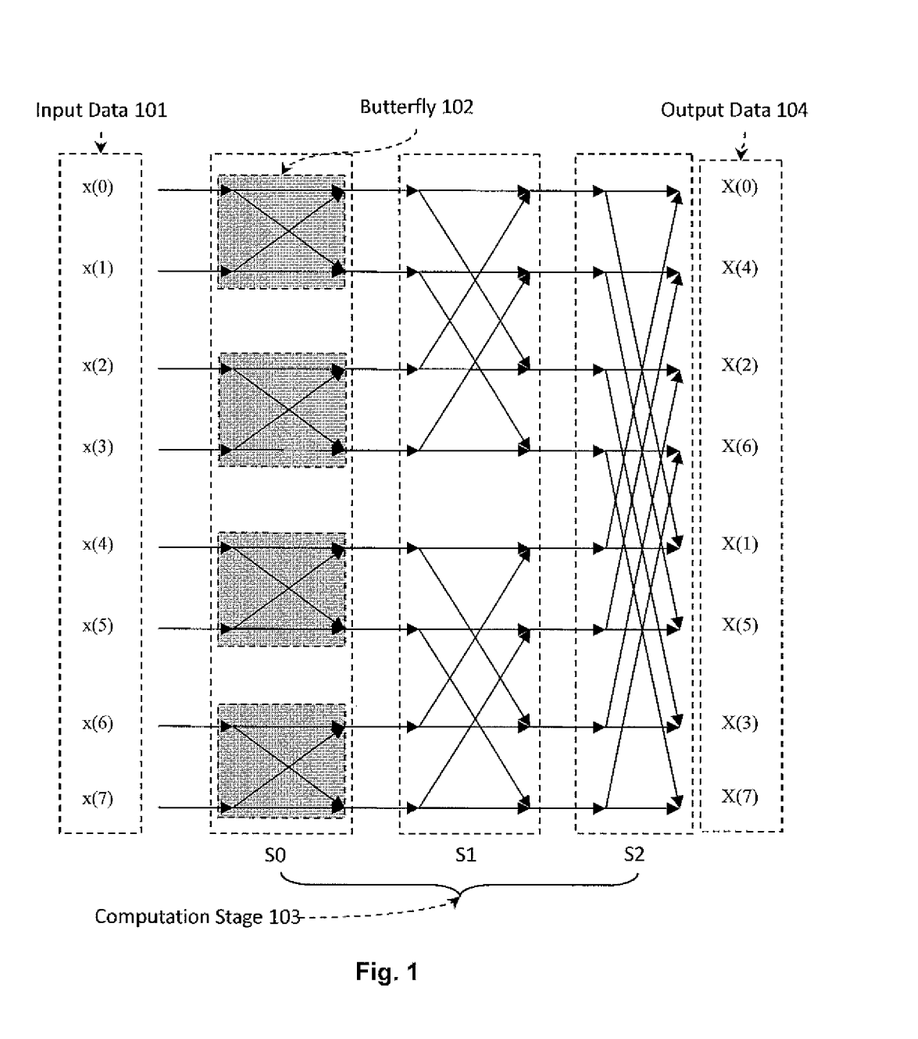
FIG. 1 is a flowchart of a 2-based FFT algorithm with decimation in time when the data length is 8.
Figure 2:
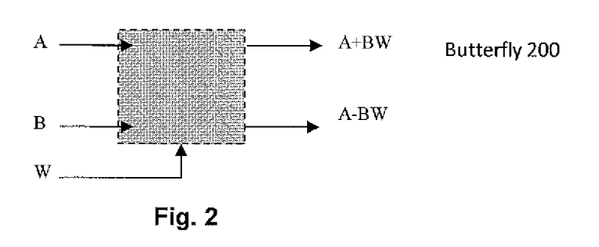
FIG. 2 is a schematic diagram of a basic butterfly unit.

FFT takes N pieces of data as input and outputs N pieces of data. In general, a transform from time to frequency domain is called forward transform, while a transform from frequency to time domain is called inverse transform. There are many approaches for implementing FFT, and they are all evolved from the Cooley-Tukey algorithm. The radix-2 Cooley-Tukey algorithm has $\log_2 N$ computation stages for N data points. Each computation stage takes N data points as input and outputs N data points. The output from the previous stage is sorted in certain manner and used as input to the next stage. The input to the first stage is original data, and the output from the last stage is the result of FFT computation. FIG. 1 shows a computation flow including three computation stages 103 (S0, S1, S2) by assuming that the length of the data points is 8. Each computation stage 103 is formed by N/2 butterfly units 102, of which the computation flow is shown in FIG. 2. Each butterfly unit 102 takes two data points A and B and a twiddle factor W as input, and obtains two results A+BW and A−BW after butterfly computation. In the computation of each butterfly unit, the serial numbers of the input data A and B has a correspondence which is determined by which computation stage the butterfly unit is positioned, and the serial number of the input data A or B. Meanwhile, the value of the twiddle factor W is determined by the computation stage 103 where the current butterfly unit is positioned, the serial number of the input data A or B, and the data length for FFT. In the computation stage S0 of FIG. 1, the first data and the zeroth data form a butterfly unit, the zeroth data is the input A to the butterfly unit, and the first data is the input B to the butterfly unit. The value of W is 1. In the computation stage S1, the first data and the third data form a butterfly unit, the first data is the input A of the butterfly unit, the third data is the input B of the butterfly unit, and the value of W is 1.

The computation stages are data-dependent, and the next stage can start its computation until the computation of the previous stage is completed. Accordingly, after completing the computation, each stage stores the results in a memory, and the next stage reads from the memory the computation results of the previous stage as input. The butterfly units in a computation stage are independent of each other, and the order in which these butterfly units conduct computation does not affect the results. However, the data A, B and the twiddle factor W read out by each butterfly unit must satisfy certain internal correspondence.

Studies are currently made on parallel FFT computation at home and abroad, such as CN patent 200910054018.9 ("Method for Implementing Parallel-Structure FFT Processors Based on FPGA"), CN patent 201110163600.6 ("FFT Device and Method Based on Parallel Processing"), U.S. Pat. No. 6,792,441B2 ("Parallel MultiProcessing For Fast Fourier Transform With Pipeline Architecture"). Such patent documents focus on how to decompose a long sequence of FFT data into a plurality of short sequences of FFT data, use a plurality of processors to compute the respective short sequences of FFT data in parallel, and then interleave the short sequences of FFT results to obtain a final long sequence of FFT result. There are multiple stages of butterfly computation in FFT of short sequences. Each stage of butterfly computation requires associated memory access operations, which cause a long delay. Therefore, such parallel butterfly computation methods are limited in terms of speed.

SUMMARY

In view of the above problems, the present disclosure provides a method and device for multi-granularity parallel FFT butterfly computation of input data using a plurality of buffers.

According to an aspect of the present disclosure, a method for multi-granularity parallel FFT butterfly computation of input data using a plurality of buffers is provided, wherein a first buffer and a second buffer are configured to buffer data for butterfly computation stages in a parallel FFT butterfly group, a third buffer is configured to buffer twiddle factors for the butterfly computation stages in the parallel FFT butterfly group, and a fourth buffer is configured to buffer result data after completion of computation of the parallel FFT butterfly group, wherein N points of input data are divided and inputted to $\lceil(\log_2 N)/L\rceil$ computation nodes, each comprising $\lceil N/2^L \rceil$ butterfly groups, the butterfly group is a basic unit of parallel butterfly computation, wherein $\lceil\ \rceil$ denotes a ceiling operation, L is a parallel granularity factor and defines that a number of data which can be read in parallel and used independently in butterfly computation is $2^L$;

a FFT butterfly computation method in the butterfly group comprises:

step 1, setting an initial value of a counter i=L−Rq;

step 2, reading $2^L$ points of data for the butterfly computation from the first or second buffer via a multiplexer MUX, dividing the $2^L$ points of data into $2^{L-1}$ groups, and reading sequentially from the third buffer the twiddle factors for $2^{L-1}$ parallel butterfly computations;

step 3, performing a stage of parallel butterfly computations on the $2^{L-1}$ groups of data;

step 4, writing results of the butterfly computations into the second buffer, and rearranging the data;

step 5, changing the current value i of the count to i=i−1;

step 6, determining whether the value i is equal to 0, and proceeding to step 7 if i=0 indicating the computations of the current butterfly group have been completed, otherwise returning to step 2;

step 7, writing the data in the second buffer into the fourth buffer, and ending the computation for the butterfly group.

According to another aspect of the present disclosure, a device for multi-granularity parallel FFT butterfly computation of input data using a plurality of buffers is provided, wherein the device comprises a plurality of buffers, a counter, a plurality of data gating modules, a plurality of butterfly computation modules, a writeback control module, wherein wherein a first buffer and a second buffer are configured to buffer data for butterfly computation stages in a parallel FFT butterfly group;

a third buffer is configured to buffer twiddle factors for the butterfly computation stages in the parallel FFT butterfly group;

a fourth buffer is configured to buffer result data after completion of computation of the parallel FFT butterfly group;

the counter is configured to identify a number of stages require for completing butterfly computation in the butterfly group; the counter is a countdown counter having an initial value L−Rq; the value i of the counter is decremented by 1 when one of the butterfly computation stages is completed; L is a parallel granularity factor and defines that a number of data which can be read in parallel and used independently in butterfly computation is $2^L$; Rq indicates that the current butterfly group starts its computation from the Rqth stage;

the plurality of data gating modules are configured to select to read $2^L$ points of data for butterfly computation from the first or second buffer based on the value of the counter, and each data gating module takes 2 points of data as input;

each of the plurality of butterfly computation modules are configured to read data from a corresponding one of the data gating modules, perform butterfly computation on the read data based on the twiddle factors buffered in the third buffers, and write result data into the second buffer;

the write back control module is configured to determine whether to write the data in the second buffer into the fourth buffer based on the value of the counter.

In the method of the present disclosure, data and twiddle factors for parallel FFT butterfly computation are obtained from the input buffers and the twiddle factor buffer at a time. The data and twiddle factors in the input buffers and the twiddle factor buffer have been prepared according to particular parallel granularity and data format, and thus there is no need for any extra bit reversal operation. The read data and twiddle factors can be directly used in FFT butterfly computation. After the data and twiddle factors for butterfly computation are read from the input buffers and the twiddle factor buffer, multi-stage butterfly computation within the butterfly group 302 is implemented in parallel inside the operational component. The results of butterfly computation are written back to the input buffers upon completion of the plurality of butterfly computation stages, and no intermediate access to the buffers is required. Throughout the parallel FFT butterfly computation, each stage of butterfly computation is not in-place operation. The result data of each stage of butterfly computation need to be rearranged so as to enable proper execution of next stage of butterfly computation. The data rearrangement may be implemented with a data rearrangement buffer.

The device of the present disclosure reads data and twiddle factors for computation in one butterfly group from the input buffers and the twiddle factor buffer at a time, performs multi-stage butterfly computation in parallel using uniform butterfly representations, and writes the results back to the input buffers. In this way, it is possible to greatly reduce the frequency for accessing the memory, improve speed for butterfly computation, and reduce power consumption. The present disclosure can achieve multi-granularity butterfly computation of various data formats in a parallel and efficient manner. The present disclosure can specify the parallel granularity and data format for butterfly computation according to particular applications, and are applicable to FFT butterfly computation of balanced and unbalanced groups.

DETAILED DESCRIPTION OF THE EMBODIMENTS

In the following, the present disclosure will be further explained with reference to the figures and specific embodiments so that the objects, solutions and advantages of the present disclosure become more apparent.

Figure 3:
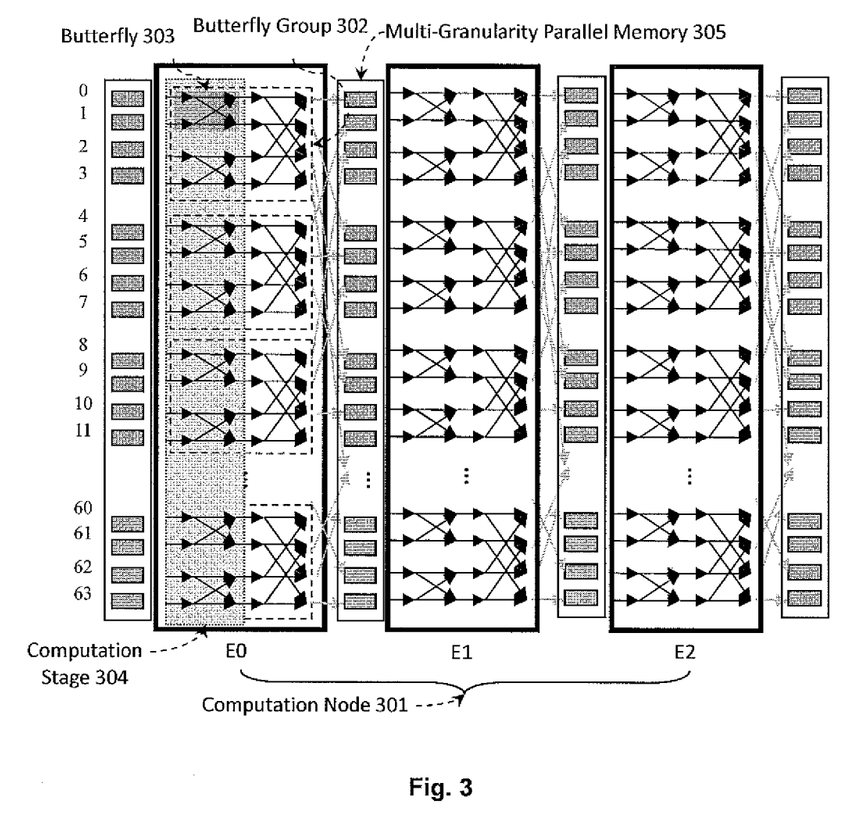
FIG. 3 is a schematic diagram showing a butterfly unit, a butterfly group, a computation stage and a computation node according to the present disclosure.

In parallel FFT computation, a computation module reads data and respective twiddle factors for multiple butterfly units from a multi-granularity parallel memory, performs a plurality of multi-stage butterfly computations in parallel, and then writes computation results in parallel into the memory for use in the next stage, as shown in FIG. 3. Here, assuming that the data length is 64, and parallel granularity is 4, that is, the multi-granularity parallel memory 305 support reading/writing 4 pieces of data each time. Meanwhile, 4 data-dependent butterfly units 303 in two adjacent stages form a butterfly group 302, and the butterfly groups in the two adjacent stages form a computation node 301. The butterfly computation module reads data points and twiddle factors required for one butterfly group in parallel from the memory 305, and writes computation results in parallel into the memory 305 after completing the computation of the butterfly group.

In the butterfly group 302, the input A, B and W to each butterfly unit must satisfy the internal correspondence. Therefore, in the parallel FFT computation, consideration must be made as to the distribution of data and twiddle factors in the memory, and read/write (R/W) addresses and R/W schemes for each butterfly group 302, in order to guarantee that the butterfly computation module can always read desired data and twiddle factors in parallel.

For the parallel FFT read/write and computation, definitions are first given as follows:

Parallel granularity $2^L$ (L is a positive integer): parallel granularity refers to the number of data which can be read in parallel from a buffer and used independently in butterfly computation, L is parallel granularity factor.

Start computation stage Rq in a butterfly group: it denotes a computation stage from which computation in a current butterfly group starts. When N-point FFT is a balanced group, i.e., $N=(2^L)^k$, k is a positive integer, there are L stages of butterfly units in each butterfly group, and Rq is always set to 0. When N-point FFT is an unbalanced group, i.e., $N \neq (2^L)^k$, the butterfly group in the last computation node does not need L stages of butterfly units, and Rq is set to 1~(L−1) according to the value of N. That is, computation starts from the Rqth butterfly stage, and it indicates that the computation of the current FFT butterfly group requires L−Rq stages of butterfly computation.

The results of a basic FFT butterfly computation are referred to as A±B*W, where A and B indicate first and second data for the FFT butterfly computation, respectively, and W indicates the twiddle factor.

FIG. 3 is a schematic diagram showing a butterfly unit, a butterfly group, a computation stage and a computation node according to the present disclosure. The overall N-point FFT computation consists of a plurality of computation nodes 301. The number of the computation nodes is influenced by the parallel granularity $2^L$ for butterfly group. For N-point FFT computation, if the parallel granularity for butterfly group is $2^L$, the number of the computation nodes is $\lceil (\log_2 N)/L \rceil$, wherein ⌈ ⌉ denotes a ceiling operation. Each computation node 301 includes $\lceil N/2^L \rceil$ computation groups 302, each of which consists of multiple computation stages 304. The butterfly group 302 is the minimal parallel unit of the FFT butterfly computation. In a balanced group for FFT, the butterfly groups in respective computation nodes have the same structure and operational process. That is, The N-point input data are repeatedly processed by $\lceil (\log_2 N)/L \rceil * \lceil N/2^L \rceil$ times in the basic unit of butterfly group, until the final results are obtained. In an unbalanced group for FFT, the butterfly groups in the last computation node have a different structure from the butterfly groups in the previous computation nodes, while the operational process are substantially the same. The butterfly computation module first reads data and twiddle factors required for computation of a butterfly group 302 from the input buffer and the twiddle factor buffer (here, the data are read from the multi-granularity parallel memory 305 and placed into the input buffer and the twiddle factor buffer), performs butterfly computation, and writes the computation results to the output buffer (here, the data are eventually retrieved from the output buffer and written back to the multi-granularity parallel memory 305, and the buffers act as an intermediate for data interaction between the memory and the computation module).

Figure 4:
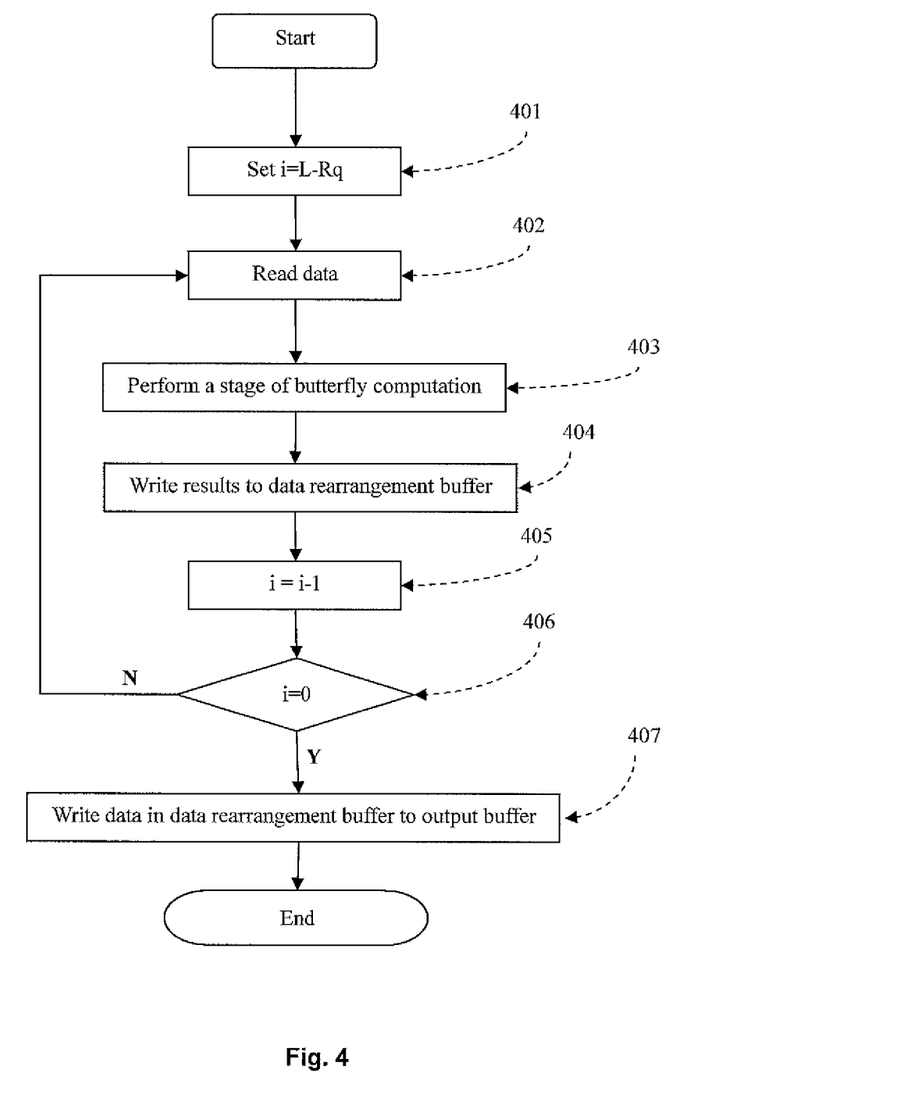
FIG. 4 is a flowchart showing a method for multi-granularity parallel FFT butterfly group computation according to the present disclosure.

FIG. 4 is a flowchart showing a method for multi-granularity parallel FFT butterfly group computation according to the present disclosure. As shown in FIG. 4, the method for multi-granularity parallel FFT butterfly group computation provided in the present disclosure includes the following steps.

Step 401, set an initial value of the counter i=L−Rq. Here, L is a parallel granularity factor and defines that a number of data which can be read in parallel and used independently in butterfly computation is $2^L$. Rq indicates that the current butterfly group starts its computation from the Rqth stage. In a balanced group of FFT, R is always set to 0. In an unbalanced group of FFT, Rq is set to 1~(L−1) according to the value of N. The initialization of i as L−Rq indicates how many stages of butterfly computation are required for computation of the current FFT butterfly group.

Step 402, read $2^L$ points of data for the butterfly computation via a multiplexer (MUX), divide the $2^L$ points of data into $2^{L-1}$ groups, and read sequentially from the third buffer the twiddle factors for $2^{L-1}$ parallel butterfly computations.

The data may be read from either an input buffer or a data rearrangement buffer. A control signal for the MUX may be derived from the value i of the counter. When i=L−Rq, the data are read from the input buffer, otherwise the data are read from the data rearrangement buffer.

The twiddle factors are stored in the twiddle factor buffer in the following manner. If there are $2^L$ points of input data, there will be a total of $(L-Rq)*2^{L-1}$ twiddle factors stored in the twiddle factor buffer; the $(L-Rq)*2^{L-1}$ twiddle factors are divided into L−Rq groups, each having $2^{L-1}$ twiddle factors; the $2^{L-1}$ twiddle factors in the (L−Rq)th group are different from each other; every two of the $2^{L-1}$ twiddle factors in the (L−Rq−1)th group are the same, that is, $2^{L-2}$ different twiddle factors; every four of the $2^{L-1}$ twiddle factors in the (L−Rq−2)th group are the same, that is, $2^{L-3}$ different twiddle factors; and so on.

Step 403, perform a stage of parallel butterfly computations on the $2^{L-1}$ groups of data.

Step 404, write results of the butterfly computations into the data rearrangement buffer, and rearrange the data for next butterfly computation.

Step 405, change the current value i of the count to i=i−1. The value denotes how many stages remain for the butterfly computation.

Step 406, determine whether the value i is equal to 0, and proceed to step 407 if i=0 indicating the computations of the current butterfly group have been completed, otherwise return to step 402.

Step 407, write the data in the data rearrangement buffer into the data output buffer, and end the computation of the butterfly group.

Figure 5:
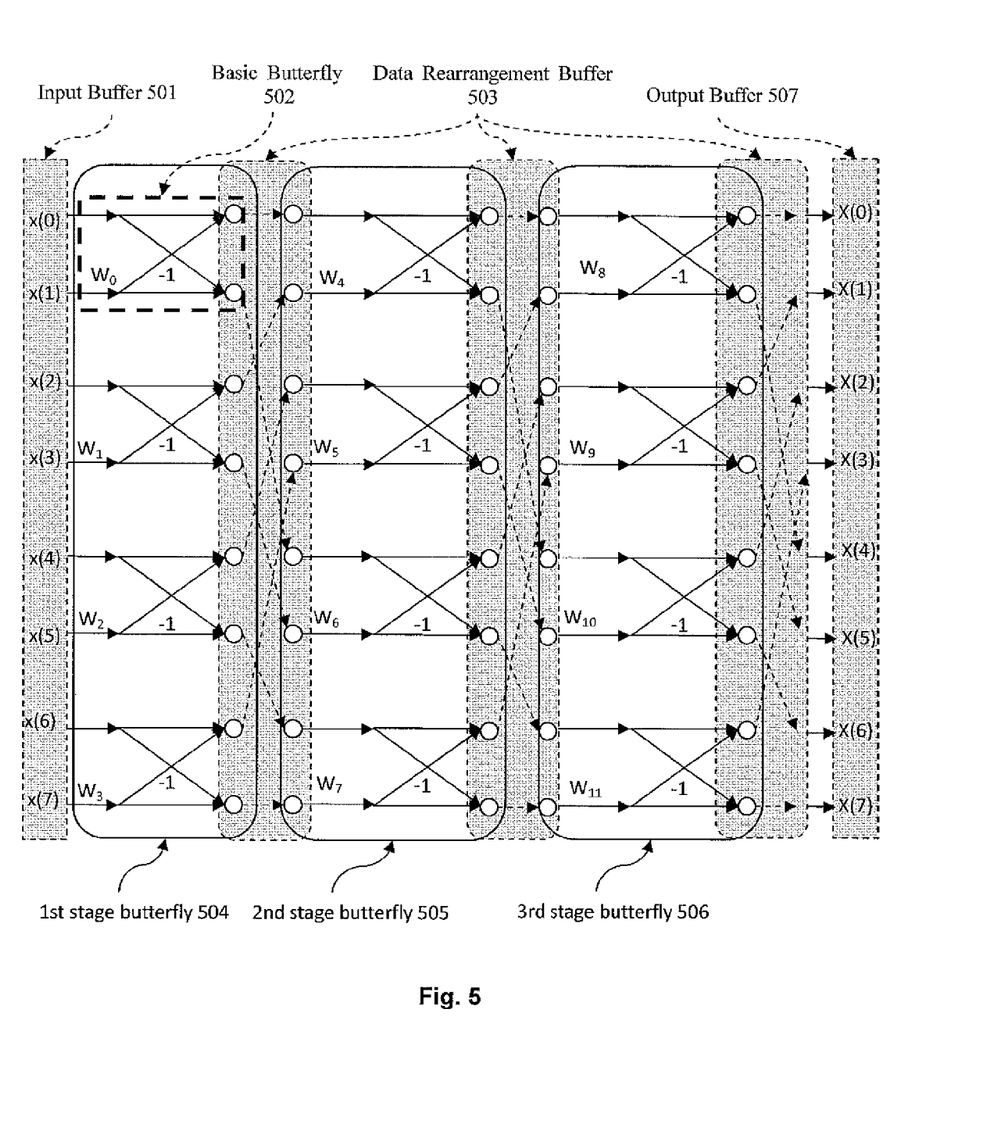
FIG. 5 is a schematic diagram showing an algorithm of an 8-point butterfly group according to the present disclosure.

Taking 8-point input data as example, FIG. 5 is a schematic diagram showing an algorithm of an 8-point butterfly group according to the present disclosure. As shown in FIG. 5, the computation of the 8-point butterfly group includes the following steps.

Step 51, read data and twiddle factors for 8-point butterfly computation from the input buffer 501 and the twiddle factor buffer (not shown in the figure), respectively.

Step 52, divide the read data and twiddle factors for 8-point butterfly computation into 4 group to form 4 basic butterfly units 502, and perform the first stage 504 of butterfly computation.

Step 53, write the results of the first stage 504 of butterfly computation into the data rearrangement buffer 503 so as to rearrange the results.

Step 54, retrieve the rearranged data from the data rearrangement buffer 503, and perform the second stage 505 of butterfly computation.

Step 55, write the results of the second stage 505 of butterfly computation into the data rearrangement buffer 503 so as to rearrange the results.

Step 56, retrieve the rearranged data from the data rearrangement buffer 503, and perform the third stage 506 of butterfly computation.

Step 57, write the results of the third stage 506 of butterfly computation into the data rearrangement buffer 503 so as to rearrange the results, and finally write the rearranged data from the data rearrangement buffer 503 to the output buffer 507.

Figure 6:
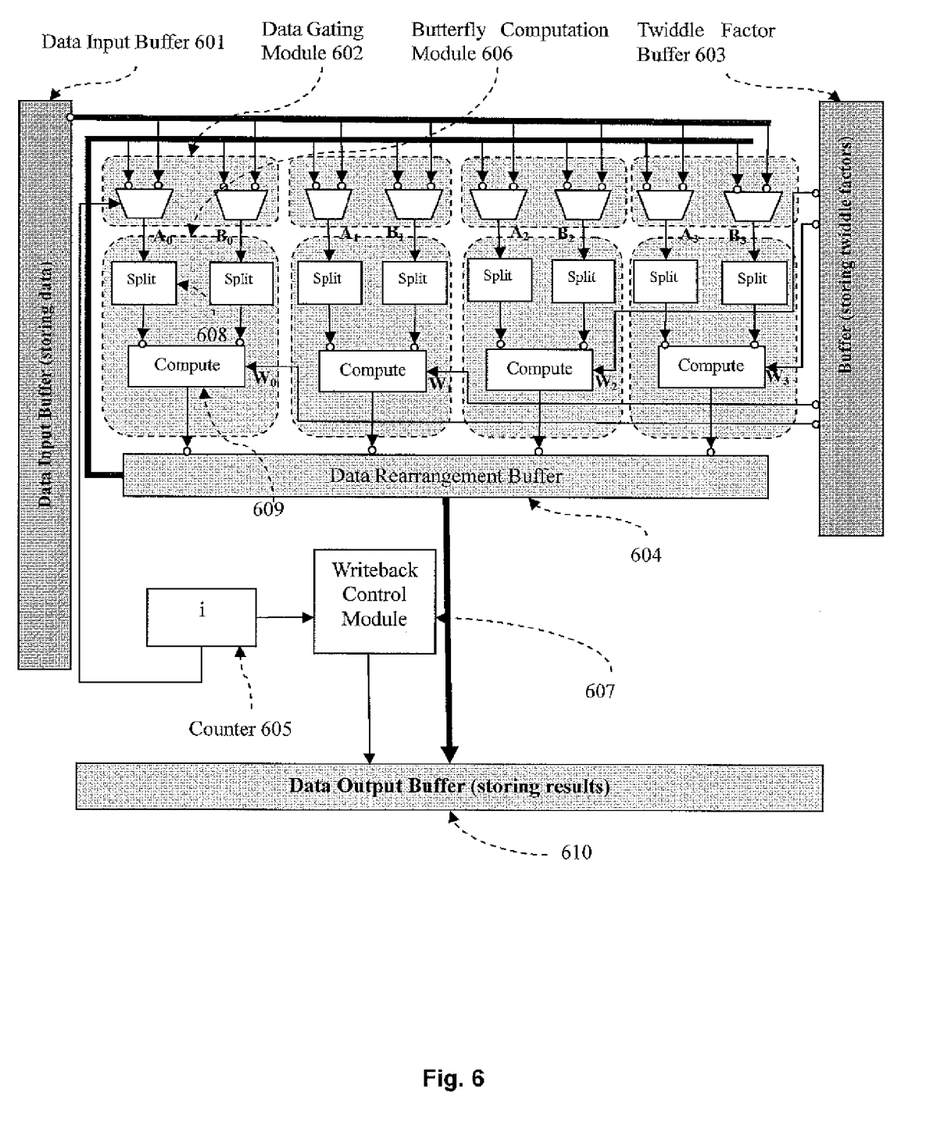
FIG. 6 is a block diagram of hardware within an 8-point FFT butterfly group.

FIG. 6 is a block diagram of hardware within an 8-point FFT butterfly group, when FFT butterfly computation is performed with L=3. Here, the 8-point input data are divided into 4 groups for parallel processing. As shown in FIG. 6, the device for multi-granularity parallel FFT butterfly group computation according to the present disclosure includes a data input buffer 601, a twiddle factor buffer 603, a data rearrangement buffer 604, a counter 605, four data gating modules 602, four butterfly computation modules 606, a write back control module 607, and a data output buffer 610.

Each of the data gating modules 602 and a corresponding one of the butterfly computation modules 606 are combined for processing one group of the input data.

The data input buffer 601 is configured to buffer data for starting the computation of a butterfly group.

The twiddle factor buffer 603 is configured to buffer twiddle factors for the butterfly computation stages in the butterfly group.

The counter 605 is configured to identify the number of stages of butterfly computation. The counter is a countdown counter having an initial value L−Rq. The value of the counter is decremented by 1 when one of the butterfly computation stages is completed.

The data gating modules 602 are configured to select whether data are to be read from the data input buffer 601 or the data rearrangement buffer 604 based on the value of the counter 605. That is, a gating signal for the data gating modules 602 is derived from the counter 605. If the value of the counter 605 is L−Rq, the data gating modules 602 select to transfer 8-point data from the data input buffer 601 into the butterfly computation module 606. Otherwise, 8-point data is read is from the data rearrangement buffer 604. Each data gating module takes 2 points of data as input.

Each of the butterfly computation modules 606 is configured to perform butterfly computation on the input data. Each butterfly computation module further includes a data decomposing unit 608 and a butterfly computation unit 609.

The data decomposing unit 608 is configured to decompose data for butterfly computation into a real part and an imaginary part.

The butterfly computation unit 609 is configured to perform multi-stage butterfly computation on the decomposed data. The twiddle factors required for the butterfly computation is obtained from the twiddle factor buffer 603. The results of each stage of butterfly computation are written into the data rearrangement buffer 604.

The data rearrangement buffer 604 is configured to buffer the results of the current stage of butterfly computation, and rearrange the results in an order suitable for reading into next stage of butterfly computation.

The write back control module 607 is configured to control whether to write the data in the data rearrangement buffer 604 into the data output buffer 610. The control signal is derived from the counter 605. When the value of the counter 605 is 0, which indicates that the respective stages of parallel computation in the current butterfly group have been completed, the data in the data rearrangement buffer 604 should be written into the data output buffer 610, and the results of computation in the current butterfly group are outputted.

Figure 7:
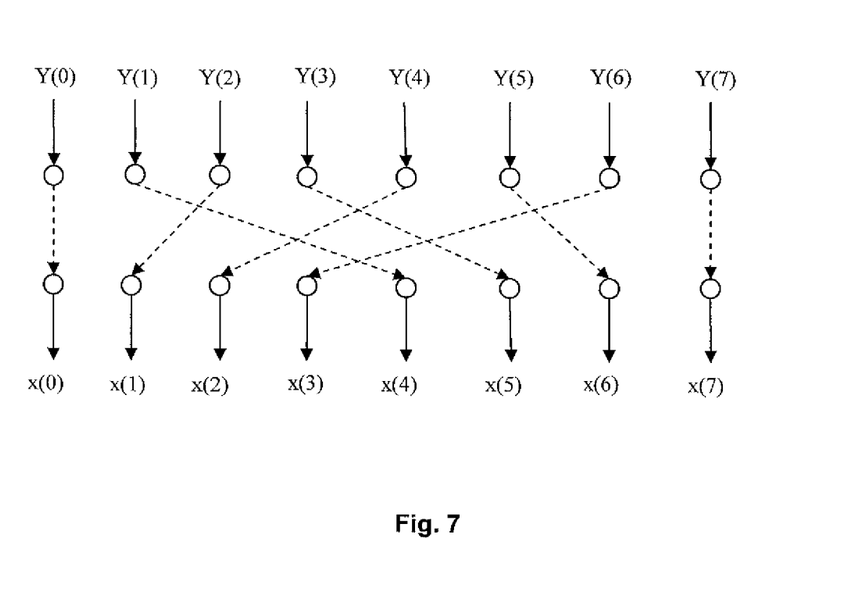
FIG. 7 is a schematic diagram showing data processing of an 8-point data rearrangement buffer.

FIG. 7 is a schematic diagram showing data processing of an 8-point data rearrangement buffer according to the present disclosure. Y(i) denotes the results of a current stage of butterfly computation, and x(i) denotes the rearrangement of Y(i), that is, input data for next stage of butterfly computation.

Rearrangement and buffering of $2^L$-point data satisfy the following rule:

$$\begin{cases} x(i) = Y(2i) \\ x(2^{L-1} + i) = Y(2i+1), 0 \le i \le 2^{L-1} \end{cases}$$

Figure 8:
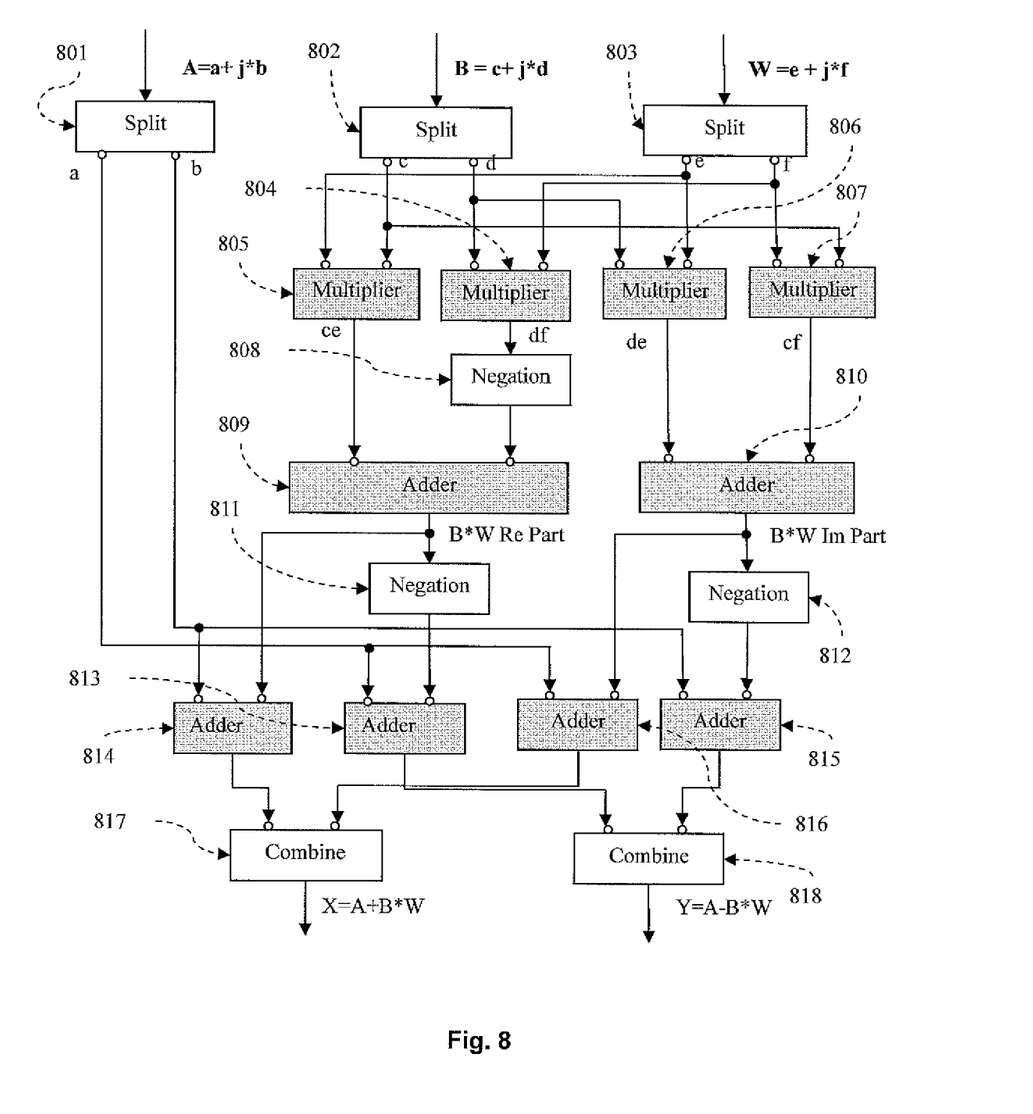
FIG. 8 is a block diagram of hardware within one basic butterfly computation module.

FIG. 8 is a block diagram of hardware within a basic butterfly computation module (e.g., the butterfly computation module 606 shown in FIG. 6) according to the present disclosure.

Let $A=a+j*b$, $B=c+j*d$, $W=e+j*f$, the results of a basic butterfly computation may be represented as:

$$X=A+B*W=(a+j*b)+(c+j*d)*(e+j*f)=(a+j*b)+[(ce-df)+j*(cf+de)]$$

$$X=A-B*W=(a+j*b)-(c+j*d)*(e+j*f)=(a+j*b)-[(ce-df)+j*(cf+de)]$$

Complex number splitting modules (801, 802, 803) split each item of data and twiddle factors for butterfly computation into a real part and an imaginary part. The real part a of the split data A is inputted to adders 813 and 816, and the imaginary part b is inputted to adders 814 and 815. The real and imaginary parts of the split data B and twiddle factors are inputted to 4 respective multipliers 804, 805, 806 and 807 to obtain four multiplication results ce, df, cf and de. The adder 809 adds ce and −df (obtained by subjecting df to a negation module (808)) to obtain a real part of B*W. The adder 810 adds cf and de to obtain an imaginary part of B*W. The real and imaginary parts of B*W each have two data flow paths, one of the paths going directly to the subsequent adders 814 and 816, and the other path going to the adders 813 and 815 via the negation modules 811 and 812, respectively. The adders 814 and 816 calculate the real and imaginary parts of A+B*W, respectively, and the real and imaginary parts are finally combined by the complex number combination module 817 to obtain the one of the results A+B*W. The other result A−B*W is obtained with the adders 813, 815, and the complex number combination module 818.

The foregoing description of the embodiments illustrates the objects, solutions and advantages of the present disclosure. It will be appreciated that the foregoing description refers to specific embodiments of the present disclosure, and should not be construed as limiting the present disclosure. Any changes, substitutions, modifications and the like within the spirit and principle of the present disclosure shall fall into the scope of the present disclosure.

What is claimed is:

1. A method for multi-granularity parallel FFT butterfly computation of input data using a plurality of buffers, wherein a first buffer and a second buffer are configured to buffer data for butterfly computation stages in a parallel FFT butterfly group, a third buffer is configured to buffer twiddle factors for the butterfly computation stages in the parallel FFT butterfly group, and a fourth buffer is configured to buffer result data after completion of computation of the parallel FFT butterfly group, wherein N points of input data are divided and inputted to $\lceil (\log_2 N)/L \rceil$ computation nodes, each comprising $\lceil N/2^L \rceil$ butterfly groups, the butterfly group is a basic unit of parallel butterfly computation, wherein denotes a ceiling operation, L is a parallel granularity factor and defines that a number of data which can be read in parallel and used independently in butterfly computation is $2^L$;

the method in the butterfly group comprises:

step 1, setting an initial value of a counter i=L−Rq, Rq indicates that the current butterfly group starts its computation from the Rqth stage;

step 2, reading $2^L$ points of data for the butterfly computation from the first or second buffer via a multiplexer (MUX), dividing the $2^L$ points of data into $2^{L-1}$ groups, and reading sequentially from the third buffer the twiddle factors for $2^{L-1}$ parallel butterfly computations;

step 3, performing a stage of parallel butterfly computations on the $2^{L-1}$ groups of data;

step 4, writing results of the butterfly computations into the second buffer, and rearranging the data;

step 5, changing the current value i of the count to i=i−1;

step 6, determining whether the value i is equal to 0, and proceeding to step 7 if i=0 indicating the computations of the current butterfly group have been completed, otherwise returning to step 2;

step 7, writing the data in the second buffer into the fourth buffer, and ending the computation for the butterfly group.

2. The method of claim 1, wherein at the step 2, the MUX reads data from the first buffer if i=L−Rq, otherwise the MUX reads data from the second buffer.

3. The method of claim 1, wherein the twiddle factors are stored in the third buffer in the following manner: if there are $2^L$ points of input data, there are a total of $(L-Rq)*2^{L-1}$ twiddle factors stored in the third buffer; the $(L-Rq)*2^{L-1}$ twiddle factors are divided into L−Rq groups, each having $2^{L-1}$ twiddle factors; the $2^{L-1}$ twiddle factors in the (L−Rq)th group are different from each other; every two of the $2^{L-1}$ twiddle factors in the (L−Rq−1)th group are the same, that is, $2^{L-2}$ different twiddle factors; every four of the $2^{L-1}$ twiddle factors in the (L−Rq−2)th group are the same, that is, $2^{L-3}$ different twiddle factors; and so on.

4. The method of claim 1, wherein at the step 4, the second buffer is configured to rearrange the data in an order suitable for reading into next stage of butterfly computation; with $2^1$-point input data Y(i), an output x(i) of the second buffer is:

$$\begin{cases} x(i) = Y(2i) \\ x(2^{L-1} + i) = Y(2i+1), 0 \le i \le 2^{L-1} \end{cases}.$$

5. A device for multi-granularity parallel FFT butterfly computation of input data, comprising:
 a first buffer and a second buffer configured to buffer data for butterfly computation stages in a parallel FFT butterfly group;
 a third buffer configured to buffer twiddle factors for the butterfly computation stages in the parallel FFT butterfly group;
 a fourth buffer configured to buffer result data after completion of computation of the parallel FFT butterfly group;
 a counter configured to identify a number of stages require for completing butterfly computation in the butterfly group; the counter is a countdown counter having an initial value L−Rq; the value i of the counter is decremented by 1 when one of the butterfly computation stages is completed; L is a parallel granularity factor and defines that a number of data which can be read in parallel and used independently in butterfly computation is $2^L$; Rq indicates that the current butterfly group starts its computation from the Rqth stage;
 a plurality of data gating modules configured to select to read $2^L$ points of data for butterfly computation from the first or second buffer based on the value of the counter, and each data gating module takes 2 points of data as input;
 a plurality of butterfly computation modules each configured to read data from a corresponding one of the data gating modules, perform butterfly computation on the read data based on the twiddle factors buffered in the third buffers, and write result data into the second buffer;
 a writeback control module is configured to determine whether to write the data in the second buffer into the fourth buffer based on the value of the counter.

6. The device of claim 5, wherein the data gating modules are further configured to read data from the first buffer if i=L−Rq, otherwise read data from the second buffer.

7. The device of claim 5, wherein each butterfly computation module further comprises:
 a data decomposing unit configured to decompose data for butterfly computation into a real part and an imaginary part; and
 a butterfly computation unit configured to perform multi-stage butterfly computation on the decomposed data based on the twiddle factors buffered in the third buffer;
 wherein, the results of each stage of butterfly computation are written into the second buffet; and
 the second buffer is configured to rearrange the results of the current stage of butterfly computation in an order suitable for reading into next stage of butterfly computation.

8. The device of claim 7, wherein with $2^L$-point input data Y(i), an output x(i) of the second buffer is:

$$\begin{cases} x(i) = Y(2i) \\ x(2^{L-1} + i) = Y(2i+1), 0 \le i \le 2^{L-1} \end{cases}.$$

9. The device of claim 5, wherein the twiddle factors are stored in the third buffer in the following manner: if there are $2^L$ points of input data, there are a total of $(L-Rq)*2^{L-1}$ twiddle factors stored in the third buffer; the $(L-Rq)*2^{L-1}$ twiddle factors are divided into L−Rq groups, each having $2^{L-1}$ twiddle factors; the $2^{L-1}$ twiddle factors in the (L−Rq)th group are different from each other; every two of the $2^{L-1}$ twiddle factors in the (L−Rq−1)th group are the same, that is, $2^{L-2}$ different twiddle factors; every four of the $2^{L-1}$ twiddle factors in the (L−Rq−2)th group are the same, that is, $2^{L-3}$ different twiddle factors.

10. The device of claim 5, wherein the writeback control module is configured to determine to write the data in the second buffer into the fourth buffer, when the value of the counter is 0.

* * * * *